United States Patent [19]

Krüger

[11] Patent Number: 4,627,970

[45] Date of Patent: Dec. 9, 1986

[54] METHOD OF TREATMENT OF SLUDGE FROM A FLUE GAS DESULFURIZATION PLANT

[75] Inventor: Berthold Krüger, Herne, Fed. Rep. of Germany

[73] Assignee: Gottfried Bischoff Bau Kompl. Gasreinigungsund Wasserrückkühlanlagen GmbH & Co., Essen, Fed. Rep. of Germany

[21] Appl. No.: 715,189

[22] Filed: Mar. 22, 1985

[30] Foreign Application Priority Data

Apr. 19, 1984 [DE] Fed. Rep. of Germany ....... 3414822

[51] Int. Cl.[4] .......................... C01F 1/46; C01B 17/00; B01D 37/02; C02F 1/00
[52] U.S. Cl. .................................. 423/555; 423/166; 423/242; 210/777; 210/778
[58] Field of Search .................... 423/242 A, 166, 555, 423/244 R, 242 R, 244 A; 210/777, 778

[56] References Cited

U.S. PATENT DOCUMENTS

| | | | |
|---|---|---|---|
| 3,903,243 | 9/1975 | Atsukawa et al. | 423/242 |
| 4,388,197 | 6/1983 | Lumikko | 210/777 |
| 4,503,020 | 3/1985 | Weissert | 423/555 |

FOREIGN PATENT DOCUMENTS

| | | | |
|---|---|---|---|
| 3205636 | 1/1983 | Fed. Rep. of Germany . | |
| 3129878 | 10/1983 | Fed. Rep. of Germany . | |
| 55-134632 | 10/1980 | Japan | 423/242 |
| 56-155617 | 1/1981 | Japan | 423/555 |

*Primary Examiner*—Gregory A. Heller
*Attorney, Agent, or Firm*—Karl F. Ross; Herbert Dubno

[57] ABSTRACT

Desulfurization sludge from a flue-gas scrubber operating with calcium-containing additives is dewatered in a thin layer with precipitatable impurities in the liquid phase being precipitated out by neutralization and collected in a thin layer which is then rinsed. The presence of these precipitated impurities on the gypsum which is recovered by this process has not been found to be detrimental to the use of it as a construction material.

5 Claims, 3 Drawing Figures

METHOD OF TREATMENT OF SLUDGE FROM A FLUE GAS DESULFURIZATION PLANT

CROSS REFERENCE TO RELATED APPLICATIONS

This application is related to the following commonly assigned copending applications:

| Ser. Nos. | Filing Dates |
| --- | --- |
| 493,984 (now U.S. Pat. No. 4,539,184) | 12 May 1983 |
| 515,919 (now U.S. Pat. No. 4,515,754) | 20 July 1983 |
| 539,614 (now U.S. Pat. No. 4,533,522) | 6 October 1983 |
| 546,486 (now U.S. Pat. No. 4,503,020) | 28 October 1983 |
| 559,916 (now U.S. Pat. No. 4,576,803) | 9 December 1983 |
| 570,038 (now U.S. Pat. No. 4,539,024) | 11 January 1984 |
| 580,645 (now U.S. Pat. No. 4,526,764) | 16 February 1984 |
| 613,598 (now abandoned) | 23 May 1984 |
| 640,701 | 14 August 1984 |
| 640,704 | 14 August 1984 | and to the patents and prior applications mentioned therein.

FIELD OF THE INVENTION

My present invention relates to a method of treating the desulfurization sludge, slurry or suspension (hereinafter referred to simply as sludge) of a wet-scrubber desulfurization plant and particularly to such a sludge in which the solids, apart possibly from fly ash, consist predominantly of calcium sulfate.

BACKGROUND OF THE INVENTION

Typical of the processes and apparatuses described in the aforementioned copending applications is the fact that a flue gas, especially a flue gas from an electricity-generating power plant, can be scrubbed in a scrubbing column or tower with a scrubbing liquid containing a calcium compound or calcium ions so that sulfur oxides are absorbed from the flue gas in a desulfurization operation.

In general, the scrubbing liquid is collected in a sump of the column and, with the calcium compounds and/or calcium ions, is recirculated to the scrubbing zone above the sump which can be traversed by the gas in a counterflow to the scrubbing liquid.

An oxidation zone can be provided in the sump to convert calcium sulfite and calcium bisulfite, formed by the absorption of sulfur dioxide, into calcium sulfate so that the solids which tend to come out of solution in the sump to form the sludge, predominantly consist of calcium sulfate.

An important use for this calcium sulfate is as gypsum, i.e. as a building material.

In the past, the desulfurization sludge drawn from the sump of such a scrubber and which can contain soluble impurities from the gas stream which are washed out by the scrubbing liquid was dewatered and the resulting solids washed in one or more washing stages with a washing liquid.

The washing liquid thus resulting or the liquid phase formed on dewatering contains these soluble impurities which are dissolved in the scrubbing liquid from the flue gas, the scrubbing liquid being generally water.

The liquid containing these impurities is subjected to a neutralization and as a result of this neutralization the impurities at least in part can be precipitated out and removed by filtering.

The dewatering and the subsequent washing process can be carried out in a centrifuge or in an assembly of centrifuges or on a vacuum belt filter. The impurities generally are silicates, carbonates, hydroxides, copper compounds, zinc compounds, and the like.

In German patent document-Open Application DE-OS No. 31 29 878, the washing liquid is neutralized after it has been recovered by dewatering or from the washing stage. The product is a neutralization sludge which has been discarded, e.g. by landfill deposition. This sometimes poses a disposal problem but the removal of the neutralization sludge from the liquid allows disposal of the latter without further specific treatment, e.g. by discharging into standard waste lines or as runoff.

In German patent document-Open Application DE-OS No. 32 05 636, the neutralization sludge is returned to the oxidation zone of the scrubbing column. While this has proved to be a partial answer to the disposal problem, it does not fully solve this problem because the return of the neutralization sludge to the scrubbing column and the recirculating of the sump liquid to the scrubbing zone results in an enrichment in the impurities of the sludge in the sump and which must be treated.

It should be apparent, therefore, that the very generation of a neutralization sludge which must be separately handled in various ways, as a product itself is disadvantageous.

OBJECTS OF THE INVENTION

It is the principal object of my present invention to provide an improved method of processing the desulfurization sludge of such desulfurization columns or apparatus whereby the drawbacks enumerated above are obviated.

Another object of this invention is to provide a process for treating the desulfurization sludge such that neutralization sludge is not formed as a byproduct which requires separate handling.

SUMMARY OF THE INVENTION

These objects and others which will become apparent hereinafter are attained, in accordance with the present invention, in a process in which a desulfurization sludge is withdrawn from a desulfurization column operating with a calcium-containing scrubbing liquid and with an oxidation zone so that the solids in the desulfurization sludge predominantly consist of calcium sulfate, the sludge is dewatered and formed in a thin layer (e.g. may be dewatered in this thin layer through which water is extracted), and is then washed in at least one but preferably a plurality of stages, and wherein a liquid is neutralized to precipitate precipitatable impurities scrubbed from the flue gas by the scrubbing liquid and contained in the neutralized liquid.

According to the invention, the precipitated impurities are filtered out of the liquid phase in which the precipitate is formed by the thin layer itself so that the impurities appear in the solids which form the gypsum or which may be processed subsequently to form the gypsum. This allows these impurities to be carried off with the gypsum and ultimately to be used in the building material formed by the gypsum.

My invention is based upon my discovery that when the process as described above is carried out and the impurities are precipitated, the precipitated products do not appear to affect the gypsum either as to the subsequent handling of the gypsum or as to the treatment of the solids in the thin layer formed, while the thin layer of predominantly calcium sulfate solids has a high capacity for extracting the precipitated impurities from the washing liquids.

Naturally, this means that at the conclusion of the process, the gypsum on which the impurities are deposited should be thoroughly mixed to spread the impurities uniformly throughout the mass and further that the thin layer must have a sufficient thickness to retain the precipitated impurities, i.e. to effect the filtration.

When the gypsum is used as a building material, the impurities do not adversely affect this use.

According to a feature of the invention, the washing liquids containing the impurities are drawn from desulfurization sludge to form the thin layer and the withdrawn washing liquid is then neutralized. The neutralized product can then be deposited directly on a previously formed thin layer and/or can be returned to admixture with the desulfurization sludge and absorbed on the thin layer of the latter when it is first formed.

In the latter case, the neutralized washing liquid is combined with the desulfurization sludge before it is spread to form the thin layer. When mixture with the desulfurization sludge is effected thorough mixing should be effected by the use of an agitator, although direct addition of the neutralization agent to the sludge as it is deposited on the filter may also be used.

The preferred or best mode embodiment of the invention, however, provides that the neutralization sludge which is formed by neutralizing and washing liquid obtained from washing the sludge in the form of a thin layer, is then mixed with further quantities of the desulfurization sludge before they are spread to form the thin layer for dewatering and filtration so that the precipitation of precipitatable impurities in the sludge is effected at the same time as the desulfurization sludge is filtered.

In a modification, the neutralization agent is added directly to the desulfurization sludge so that the precipitation of impurities is effected directly in the desulfurization sludge, in which case, although a recycling of washing liquid can still be provided, all of the precipitated impurities may have been collected at the outset in the thin layer filtered product which is then dewatered and washed.

It will be appreciated that especially in the latter case, no neutralization sludge per se requires collection and separate handling and thus the entire problem of disposal of a neutralization sludge is eliminated. The washing liquid which is obtained, free from the neutralization sludge and the precipitatable impurities which can be separated outright by neutralization, could be recycled directly to the scrubber as makeup scrubbing liquid or can be discharged as an innocuous waste water.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
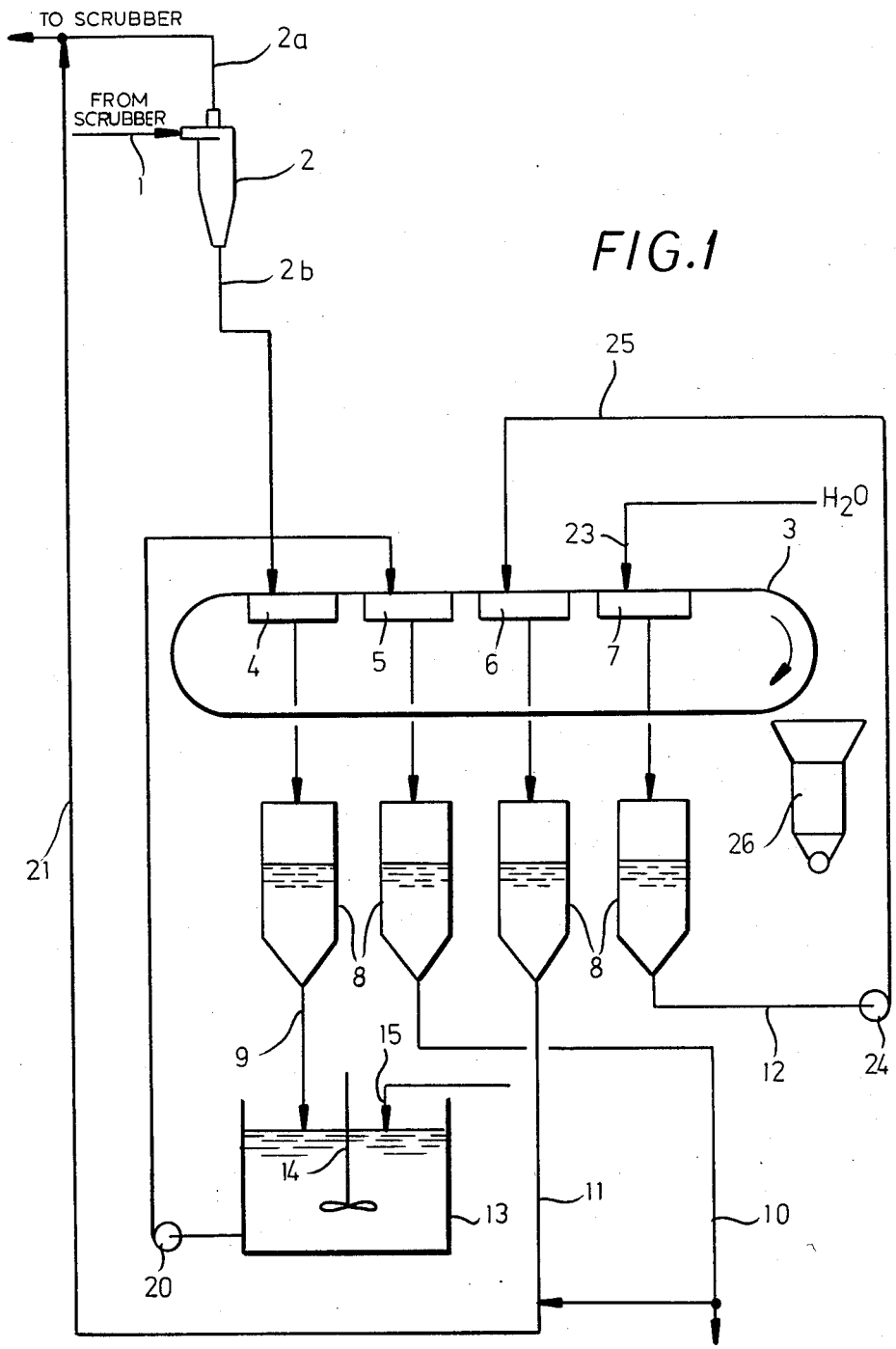
FIG. 1 is a flow diagram illustrating one approach to the method of the present invention.

In all of the Figures, I have shown an inlet line 1 which derives via a pump from the sump of a flue gas desulfurization scrubber, such as one of the scrubbers previously described. The desulfurization sludge in which the solids component consists predominantly of calcium sulfate, is delivered to a hydrocyclone 2 which performs an initial separation or dewatering, the recycled liquid being returned at 2a to the scrubber while the desulfurization sludge is recovered at 2b.

The desulfurization sludge is deposited continuously in a thin layer on a vacuum belt filter 3 carrying the sludge over four zones 4, 5, 6, 7 which may be suction boxes, whose suction pumps have not been shown and which apply suction to the underside of the belt. The suction pumps deliver respective liquids to the collecting vessels 8.

The first zone 4 is a dewatering zone and this zone is followed by washing zones 5, 6 and 7.

The dewatering liquid drawn from the sludge in zone 4 is delivered via line 9 to a tank 13 provided with a motor-driven stirrer 14. A neutralizing solution inlet 15 opens into this tank to introduce, for example, calcium hydroxide as a neutralizing agent or sodium hydroxide, e.g. in an aqueous solution. The amount of neutralizing agent thus added should be sufficient to precipitate the precipitatable impurities mentioned previously and which are entrained in a solution from a desulfurization column.

The precipitate of the impurities, in suspension in the liquid, is displaced by a pump 20 to the first washing stage 5 where it is deposited on the thin dewatered layer of desulfurization sludge so that the gypsum here acts as a filter mass absorbing the fine precipitate particles.

The liquid which is thus recovered at 10 can be disposed of as an innocuous effluent or recycled as has been shown at 24, as a makeup addition to the scrubbing liquid scrubber.

Fresh water as a washing liquid is introduced at stage 7 via line 23 and the washing liquid from this stage is recovered at line 12 and delivered by a pump 24 and a line 25 to the stage 6.

The gypsum product is collected in the mixing bin 26 in which it is thoroughly blended for subsequent use as a precursor in the manufacture of plastic building materials. The liquid collected to the washing stage 6 is combined with recycled effluent from stage 5 in line 21 as makeup water for the scrubber or scrubbers.

Figure 2:
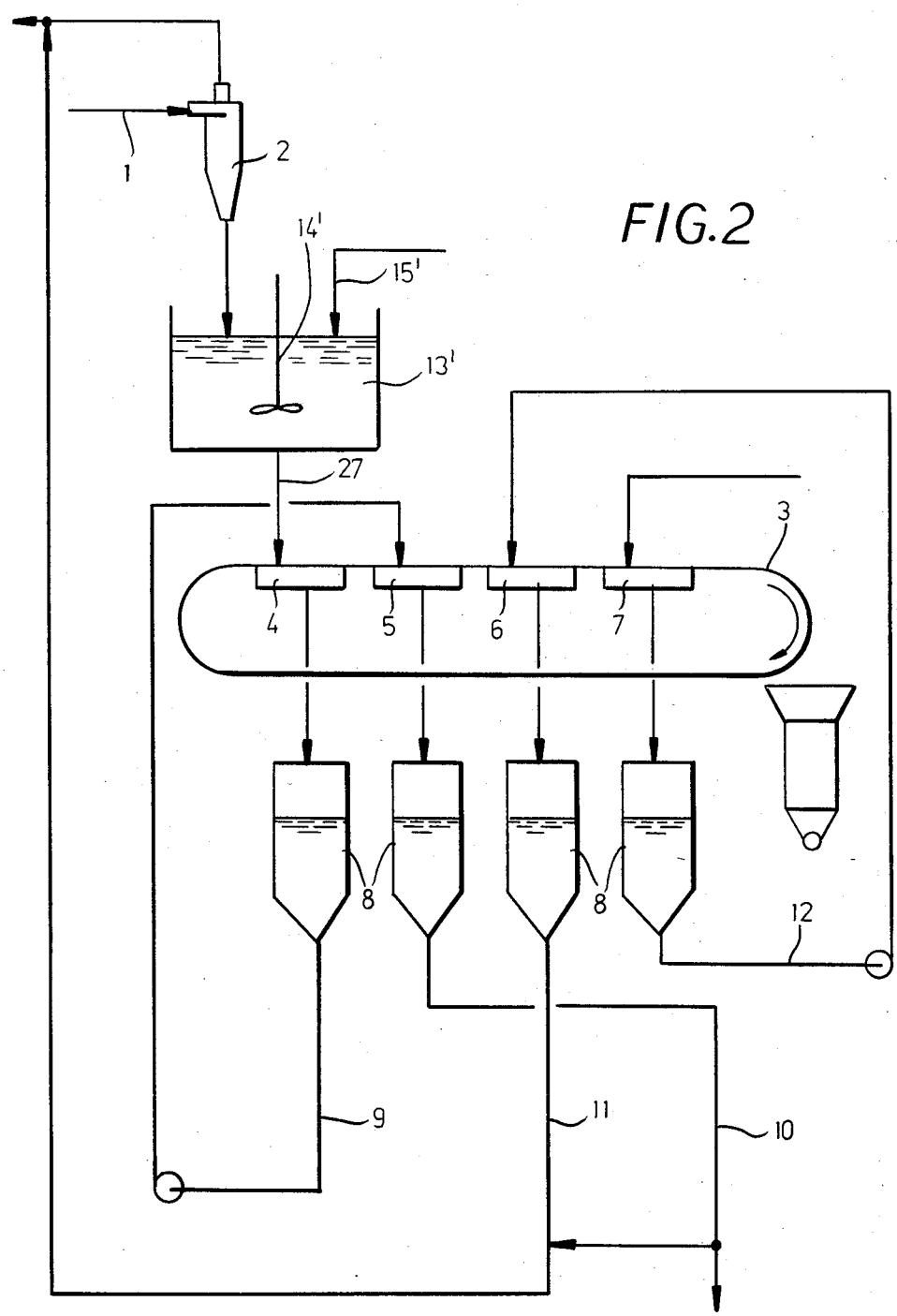
FIG. 2 is a flow diagram showing an alternative.

The method illustrated in FIG. 2 differs from that shown in FIG. 1 in that the impurities precipitate is not formed in the liquid phase recovered by dewatering but rather the entire desulfurization sludge is introduced into the basin 13' where it is agitated by the motor-driven stirrer 14' and thoroughly mixed with the neutralization solution added at 15'. As a consequence, the slurry deposited at 27 on the vacuum belt filter in the dewatering stage 4 already contains the precipitated impurities which collect upon the thin layer of dewatered calcium sulfite residue.

The liquid returned at 9 as the first scrubbing solution, therefore, is already free from these impurities.

The remainder of the process in FIG. 2 is similar to that of FIG. L.

Figure 3:
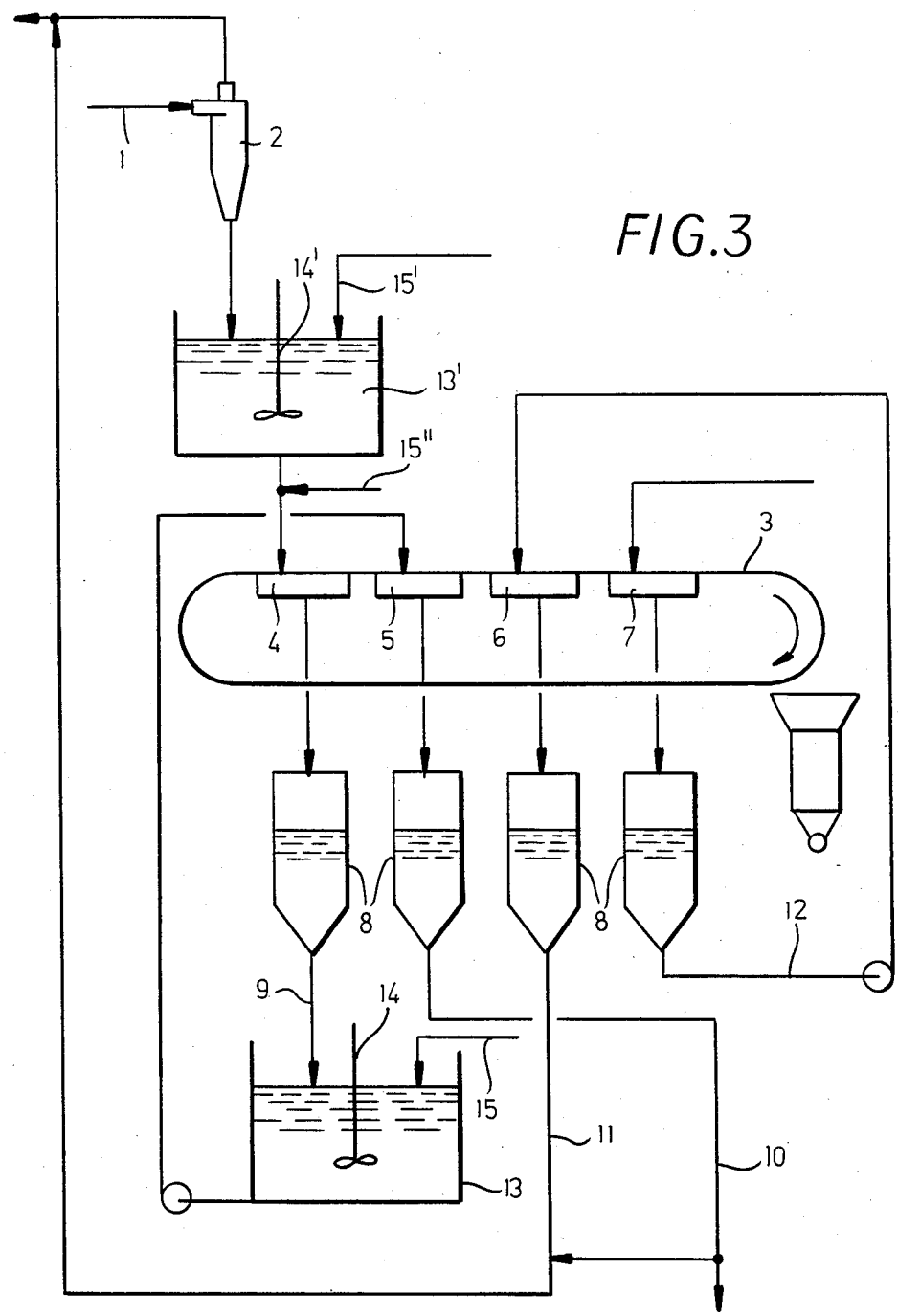
FIG. 3 is a flow diagram illustrating a method utilizing features of both approaches.

FIG. 3 shows a modification of both of these processes wherein the basin 13 is provided in addition to the basin 13' and has its agitator 14 and neutralization solution inlet 15.

Part of the neutralization is thus effected in basin 13' while any necessary remaining impurities which can be separated out by further addition of calcium hydroxide or sodium hydroxide solutions can be removed at the basin 3 and deposited on the thin layer at zone 5.

Line 15" seen in FIG. 3 also indicates that the neutralization solution can be supplied to the desulfurization sludge as it is applied to the vacuum belt factor to deposit the thin layer therein.

I claim:

1. A method of treating a desulfurization sludge containing a solids component rich in calcium sulfate and an aqueous liquid component containing soluble precipitatable impurities from the scrubbing of a flue gas and forming a liquid phase, said method comprising the steps of:
   (a) dewatering said desulfurization sludge to form a thin layer of said solids component;
   (b) washing said thin layer of said solids component in at least one washing stage with fresh water;
   (c) neutralizing said liquid phase to precipitate out said precipitatable impurities; and
   (d) collecting said precipitatable impurities on said thin layer of said solids component before the washing thereof with fresh water but after the thin layer has been formed in step (a).

2. The method defined in claim 1 wherein the liquid phase is neutralized in said desulfurization sludge before the formation of said thin layer therefrom.

3. A method of treating a desulfurization sludge containing a solids component rich in calcium sulfate and an aqueous liquid component containing soluble precipitatable impurities from the scrubbing of a flue gas and forming a liquid phase, said method comprising the steps of:
   (a) dewatering said desulfurization sludge to form a thin layer of said solids component;
   (b) washing said thin layer of said solids component in at least one washing stage with fresh water;
   (c) neutralizing said liquid phase to precipitate out said precipitatable impurities; and
   (d) collecting said precipitatable impurities on said thin layer of said solids component before the washing thereof with fresh water but after the thin layer has been formed in step (a), the liquid phase being neutralized in said desulfurization sludge before the formation of said thin layer therefrom, a neutralization solution being added to and mixed with said sludge before it is applied to a vacuum belt filter to form said thin layer.

4. A method of treating a desulfurization sludge containing a solids component rich in calcium sulfate and an aqueous liquid component containing soluble precipitatable impurities from the scrubbing of a flue gas and forming a liquid phase, said method comprising the steps of:
   (a) dewatering said desulfurization sludge to form a thin layer of said solids component;
   (b) washing said thin layer of said solids component in at least one washing stage with fresh water;
   (c) neutralizing said liquid phase to precipitate out said precipitatable impurities; and
   (d) collecting said precipitatable impurities on said thin layer of said solids component before the washing thereof with fresh water but after the thin layer has been formed in step (a), a neutralization solution being added to said sludge as it is deposited upon a vacuum belt filter to form said thin layer.

5. A method of treating a desulfurization sludge containing a solids component rich in calcium sulfate and an aqueous liquid component containing soluble precipitatable impurities from the scrubbing of a flue gas and forming a liquid phase, said method comprising the steps of:
   (a) dewatering said desulfurization sludge to form a thin layer of said solids component;
   (b) washing said thin layer of said solids component in at least one washing stage with fresh water;
   (c) neutralizing said liquid phase to precipitate out said precipitatable impurities; and
   (d) collecting said precipitatable impurities on said thin layer of said solids component before the washing thereof with fresh water but after the thin layer has been formed in step (a), a neutralization solution being added to said liquid phase after it has been withdrawn from said thin layer in the dewatering of said sludge and said liquid layer and deposited on said thin layer.

* * * * *